June 21, 1949.                C. W. BERGER                2,474,028
RECOVERY OF PHENOL SALTS FROM AQUEOUS SOLUTIONS
Filed April 6, 1946
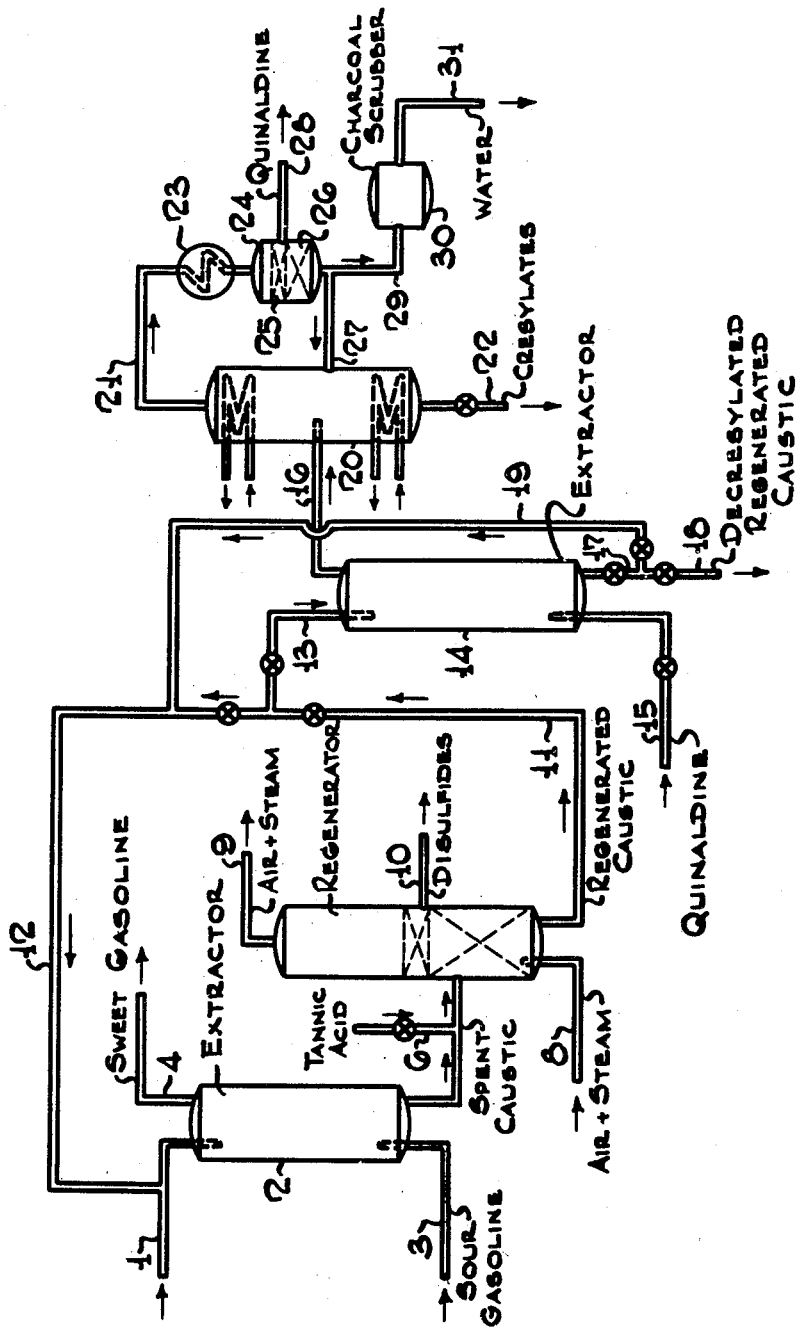
Carl W. Berger  Inventor
By Peter J. Saylor  Attorney Patented June 21, 1949

2,474,028

UNITED STATES PATENT OFFICE 2,474,028

RECOVERY OF PHENOL SALTS FROM AQUEOUS SOLUTIONS

Carl W. Berger, McPherson, Kans., assignor to The Inventors Guild, Newark, N. J., a partnership Application April 6, 1946, Serial No. 660,289

1 Claim. (Cl. 260—621)

This invention deals with the recovery of phenols from aqueous solutions. More specifically, it relates to the extraction of phenol salts from aqueous solutions by means of cyclic nitrogen bases.

It has been found that cyclic nitrogen bases, and particularly aromatic nitrogen bases (especially those with nitrogen in the aromatic nucleus) exhibit a solvent selectivity for salts of phenols, thereby enabling the latter to be extracted in good yields from aqueous solutions. The term "phenols" employed herein, signifies hydroxy aromatic compounds forming water soluble salts with alkali bases and includes mono and polyhydroxy compounds, such as phenol, cresols, resorcinol, naphthols and the like.

In my copending application Serial No. 632,723, filed on December 4, 1945, of which this application is a continuation-in-part, there was disclosed a method for removing sodium cresylate and other phenolic compounds from spent caustic by the use of aromatic bases such as quinoline, isoquinoline, quinaldine, etc. The present application covers the extraction of phenolates (which are often called phenates) from aqueous solutions, particularly from aqueous solutions containing free alkali and/or other water soluble compounds, such as salt, other salts, and the like.

The bases to be employed as solvents for the phenates are cyclic nitrogen bases, preferably normally liquid aromatic compounds having a nitrogen atom in the ring. Although aniline and pyridine may be employed, it is preferable to use the less water-soluble bases such as the quinolines (isoquinoline and quinoline, for example), quinaldine, and the like. The picolines, lutidines, ethyl pyridines, collidines, toluidines, xylidines and alkyl pyridines and similar monocyclic bases are effective, but best results are obtained with unsubstituted or substituted bicyclic aromatics having one nitrogen in a ring, particularly quinaldine, although quinoline and isoquinoline are satisfactory and effective.

The invention may be more readily understood by reference to the drawing which shows a flow sheet of one embodiment of the invention. Referring to this drawing, caustic solution, usually a 15–20% aqueous sodium hydroxide, is fed through line 1 into the top of extraction tower 2 countercurrent to sour gasoline entering at the bottom of tower 2 through line 3. Extraction of mercaptans and phenols from the gasoline takes place, and sweet gasoline is drawn off the top of the tower through line 4, while the spent caustic containing sodium mercaptides and sodium cresylates is drawn from the bottom of tower 2, through line 5. Some tannic acid is introduced from line 6 into the mixture to act as an oxidation catalyst. Thereafter, the mixture is fed into tower 7 which regenerates part of the caustic by oxidizing the mercaptides to disulfides. Into tower 8 are run in steam and air through line 8 in contact with the spent caustic layer. The alkyl disulfides formed by the oxidation may be drawn off as an oily layer through line 10, while air and some steam leave the top of the tower through line 9.

The partially regenerated caustic drawn through line 11 still contains, besides regenerated caustic, an appreciable amount of sodium cresylates, but it still has mercaptan absorbing properties, so that it may be recirculated through line 12 into the fresh caustic line 1 and into tower 2. However, as the cresylates build up in the caustic, the latter loses more and more of its absorptive capacity for mercaptans, so that it is necessary, finally, to discard the caustic as "spent caustic," in spite of the fact that it may have up to 50% of the total caustic still present therein as free NaOH.

It has been found desirable to draw off a side stream from the regenerated caustic line, through line 13 and pump it into the top of extracting tower 14 countercurrent to a stream of quinaldine pumped in through line 15 at the bottom of tower 14. Here the quinaldine extracts the sodium cresylates from the regenerated caustic, while the decresylated regenerated caustic drawn off at the bottom at 17 may be either removed through line 18 or recycled through line 19 into the regenerated caustic line 12.

The extract leaving the top of tower 14 through line 16 may be pumped into still 20 in which the quinaldine and some water are taken overhead through line 21, condensed in condenser 23 and settled in settler 24, wherein the quinaldine layer 25 floats on top of the water layer 26 and may be drawn off through line 28 for recirculation to tower 14. The water layer may be returned (preferably in part) to tower 20 through line 27 to maintain fluidity of the cresylates remaining therein, and facilitate their withdrawal through line 22, while some or all of the water may be drawn through line 29 and into a charcoal absorber 30 to remove traces of dissolved quinaldine before the water is discharged through line 31.

It is understood that, although no pumps have been shown in the flowsheet, their use is intended in any locations where gravity flow is impossible or not permitted. Other ancillary equipment such as valves, heat exchangers, coolers, etc. apparent to one skilled in the art are also presumed to be included.

This extraction is applicable to not only the sodium salts of phenols in aqueous mixtures, but also to potassium, lithium, onium and other organic base salts and, in fact, practically any water soluble salt of a phenol.

I claim:

In the extraction of sulfur and phenolic impurities from hydrocarbons containing same by the use of aqueous caustic as the solvent, the caustic extract being regenerated by oxidation to remove mercaptans, thereby obtaining a regenerated caustic, the improvement comprising extracting, in a second extraction step, at least a portion of said regenerated caustic with a normally liquid organic base having two aromatic cyclic groups, one of which contains a nitrogen atom, thereby obtaining a second extract and a raffinate phase containing substantially all of the unused caustic, separating the phases, removing the organic base from the extract, recycling said base to the second extraction step, and recycling said raffinate phase to the step for extraction of sulfur and phenolic impurities from the hydrocarbons.

CARL W. BERGER.

REFERENCES CITED

The following references are of record in the file of this patent:

UNITED STATES PATENTS

| Number | Name | Date |
|---|---|---|
| 2,096,871 | Atkins, Jr. | Oct. 26, 1937 |
| 2,152,722 | Yabroff | Apr. 4, 1939 |
| 2,193,336 | Lecher | Mar. 12, 1940 |